US012218362B2

(12) United States Patent
Chen

(10) Patent No.: US 12,218,362 B2
(45) Date of Patent: Feb. 4, 2025

(54) FLAME-RETARDANT AND EXPLOSION-PROOF BATTERY PACK FOR ELECTRIC VEHICLE AND MANUFACTURING METHOD THEREOF

(71) Applicant: Shu-Chin Chen, Taoyuan (TW)

(72) Inventor: Shu-Chin Chen, Taoyuan (TW)

(*) Notice: Subject to any disclaimer, the term of this patent is extended or adjusted under 35 U.S.C. 154(b) by 25 days.

(21) Appl. No.: 17/591,394

(22) Filed: Feb. 2, 2022

(65) Prior Publication Data
US 2022/0407156 A1 Dec. 22, 2022

(30) Foreign Application Priority Data
Jun. 16, 2021 (TW) ................. 110121892

(51) Int. Cl.
*H01M 50/143* (2021.01)
*H01M 50/278* (2021.01)
(Continued)

(52) U.S. Cl.
CPC ....... *H01M 50/143* (2021.01); *H01M 50/278* (2021.01); *H01M 50/298* (2021.01);
(Continued)

(58) Field of Classification Search
CPC ............. H01M 50/143; H01M 50/278; H01M 50/298; H01M 50/516; H01M 50/591; H01M 2220/20
See application file for complete search history.

(56) References Cited

U.S. PATENT DOCUMENTS 8,475,954 B2 * 7/2013 Ijaz ..................... H01M 50/227
429/151
2008/0050645 A1 * 2/2008 Kai ........................ B60L 50/64
429/93
(Continued)

FOREIGN PATENT DOCUMENTS

CA 2812292 A1 * 3/2012 .......... H01M 50/227
CN 111668571 A 9/2020
(Continued)

OTHER PUBLICATIONS

Machine translation of JP2019204699A. Obtained from PE2E search (Year: 2019).*
(Continued)

*Primary Examiner* — Carlos Barcena
(74) *Attorney, Agent, or Firm* — Locke Lord LLP; Tim Tingkang Xia, Esq.

(57) ABSTRACT

The present invention discloses a flame-retardant and explosion-proof battery pack for an electric vehicle and a manufacturing method thereof, the battery pack comprising: at least one battery brick consisting of batteries, which are electrically connected to define a positive electrode welding sheet and a negative electrode welding sheet; a battery brick positive electrode conducting wire and a battery brick negative electrode conducting wire, which are electrically connected to the positive electrode welding sheet and the negative electrode welding sheet, respectively; and a cover and a battery of brick container, which define a first storage space that is sufficient to accommodate the batteries, wherein the first storage space is filled with a flame-retardant oil so that the batteries are immersed in the flame-retardant oil, and the positive electrode conducting wire and the negative electrode conducting wire are exposed outside the first storage space to form a battery brick assembly.

12 Claims, 5 Drawing Sheets

(51) Int. Cl.
*H01M 50/298* (2021.01)
*H01M 50/516* (2021.01)
*H01M 50/591* (2021.01)

(52) U.S. Cl.
CPC ....... *H01M 50/516* (2021.01); *H01M 50/591* (2021.01); *H01M 2220/20* (2013.01)

(56) References Cited

U.S. PATENT DOCUMENTS

| | | | |
|---|---|---|---|
| 2013/0181826 A1* | 7/2013 | Yang | H01M 50/271 340/455 |
| 2013/0260191 A1* | 10/2013 | Takahashi | H01M 10/4257 429/61 |
| 2020/0152950 A1* | 5/2020 | Rodriguez | H01M 50/296 |
| 2021/0083255 A1* | 3/2021 | Demont | H01M 50/502 |
| 2022/0131210 A1* | 4/2022 | Botadra | H01M 50/507 |
| 2023/0369680 A1* | 11/2023 | Garrait | C09K 5/048 |

FOREIGN PATENT DOCUMENTS

| | | | |
|---|---|---|---|
| JP | 2014022151 A | 2/2014 | |
| JP | 2019204699 A * | 11/2019 | Y02E 60/10 |

OTHER PUBLICATIONS

ThermoFisher Scientific, Safety Data Sheet for "Parrafin liquid, water white", Jan. 1, 2021 (Year: 2021).*

* cited by examiner

FLAME-RETARDANT AND EXPLOSION-PROOF BATTERY PACK FOR ELECTRIC VEHICLE AND MANUFACTURING METHOD THEREOF

REFERENCE TO RELATED APPLICATIONS

The present application is based on, and claims priority from, Taiwan application number 110121892 filed Jun. 16, 2021, the disclosure of which is hereby incorporated by reference herein in its entirety.

BACKGROUND OF THE INVENTION

Field of the Invention

The technical ideas of this creation apply the physical properties of fluids having thermal conduction and air barrier properties, a high ignition point, low viscosity, electrical insulation properties and gravity of the laws of nature to a manufacturing method of a flame-retardant and explosion-proof battery pack for electric vehicles. First of all, the creation applies a fluid named "flame-retardant oil" which have the physical properties listed above. Secondly, there are also complementary innovative designs in the assembly method of the battery pack.

The containers of battery brick assemblies and battery packs of the electric vehicle power source are filled with the aforementioned flame-retardant oil, so that each battery is immersed in the flame-retardant oil having thermal conduction, electrical insulation and air barrier properties. When the batteries in the battery pack causes a short circuit occurred in the battery electrode plate for an unspecified reason, the entropy of the short circuit causing the electrode plate melted instantaneous can be conducted, quickly dispersed, absorbed by a specific heat capacity of the entire battery packs, and released to the surrounding for reducing the high-temperature of the electrode plate melted instantaneous, avoiding the entropy of the short circuit that would cause the electrode plate to melt in flame combustion, which may cause chain-combustion and explosion eventually. In terms of the field of invention, this creation discloses an innovative assembly method of the "flame-retardant oil" and the battery pack based on a number of physical properties of the laws of nature that can be applied to the manufacturing of the electric vehicle battery pack with improvements to reduce the significant defect of the electric vehicle battery pack being flammable or explosive, and to enhance the safety in driving electric vehicles.

Description of the Prior Art

At present, most of the electric vehicles use secondary lithium-ion chemical batteries as a power source due to the demand for electric energy density, and yet, the secondary lithium-ion chemical batteries are potentially exposed to combustion and explosion risks, and consequently not considered as the as the choice to be a power source for electric vehicles. For this reason, the manufacturers of electric vehicles are working towards improving the safety performance of battery materials with an aim to reduce the possibility of combustion and explosion incidents, and with the expectation to reduce the risk of combustion or explosion in electric vehicles. Since the progress is limited, the energy density of safer battery materials is barely high and the vehicle mileage is insufficient, it is difficult to meet the actual demand of the market.

The above-described secondary lithium-ion chemical battery as a power source may lead to the defects of combustion or explosion, please refer to FIG. 1 illustrating the circuit diagram of the battery pack configuration in the common electric vehicles, the connection method of the battery pack P3 in the common electric vehicles is that the positive electrodes and the negative electrodes of a plurality of battery P1 are directly connected in series to form a plurality of battery strings P2 (FIG. 1 is an embodiment of six battery strings P2), and the battery strings P2 are connected in parallel to form the battery pack P3. When the battery pack P3 is horizontally placed in the limited space of the chassis of the electric vehicle, each battery P1 in the battery string P2 needs to be electrically connected in the shortest path. In other words, the adjacent battery P1 should be configured with the positive electrode directly connecting to the negative electrode, for example: if the first battery is configured with its positive electrode facing upwards, the second battery adjacent to the first battery must be configured with its positive electrode facing downwards before it is connected to the first battery, and the third battery adjacent to the second battery is configured with its positive electrode facing upwards before it is connected to the second battery, and so on. Since there must be a voltage difference between the series-connected first battery P1, the second battery P1, or even the third battery P1, in a configuration of the battery P1 repeatedly connected in series with a positive electrode facing upwards or a positive electrode facing downwards, the battery P1 configured with positive electrode facing downwards in battery strings P2 may cause the flammable electrolyte leaking outward from the positive electrode cap of the battery can due to a battery-can sealing defect, and the leaking electrolyte has electrical conductivity, which will cause a short-circuit phenomenon of the adjacent battery P1 other than the first battery P1 connected to the second battery P1 in series, and the short-circuit phenomenon will cause the batteries P1 to generate an instantaneous high-current discharge that will eventually lead to the melting of the electrode plate in the short-circuited the battery P1 resulting in a risk of combustion or explosion. Accordingly, the battery P1 configured with the positive electrode facing upwards or the positive electrode facing downwards in the battery pack in the prior art cannot prevent the short-circuit caused by the battery P1 leakage, and that is one of the problems to be solved by the present invention.

In addition, after a search in the "Global Patent Search System", it is found that there is no precedent in the flame-retardant and explosion-proof technology for the battery pack as this creation, and it is sufficient to prove that the underlying technology of "flame-retardant and explosion-proof method battery pack for electric vehicles" is an invention applying the laws of nature and comforting to the legal requirement that "the article produced following a manufacturing process is still unknown within and outside of this country before the filing of a patent application for the manufacturing process". Thus. there seems to be no prior art disclosures in the "Global Patent Search System" for analysis before the patent filing of this creation.

However, the currently known applications of mineral oils using the physical properties of thermal conduction, air resistance, good electrical insulation, high spontaneous ignition point, and low viscosity of the laws of nature relate to applications of insulation and heat dissipation of the induction coil of the AC high voltage transformer of the power system. The technical field of the above-mentioned low-viscosity mineral oils is limited to the field of power systems. The creation applies the physical properties of low-viscosity mineral oil to a new and innovative filed of a flame-retardant and explosion-proof secondary chemical battery pack. Therefore, the creation applies the physical properties of low-viscosity mineral oils to the manufacturing method of a flame-retardant and explosion-proof battery pack for electric vehicles, which is certainly an innovation in the field of batteries or electric vehicles.

The application of mineral oils in the creation is an innovative application across the fields of the electric-vehicle manufacturing and the battery-pack manufacturing, which can exclude the doubts that the invention has been disclosed in a printed publication prior to the filing of the patent application, publicly exploited prior to the filing of the patent application, or publicly known prior to the filing of the patent application. The creation cannot be easily made or achieved by a person ordinarily skilled in the art of batteries or electric vehicles based on the prior art before the filing of the patent application. It is well known that people ordinarily skilled in the art of batteries or electric vehicles are not few, and these people do not come up with the idea or creation of the manufacturing method of this invention by seeing the AC high voltage transformer of the power system on the utility pole next to the road. Besides, there is no the relevant information found in the Global Patent Search System and no prior art heard from the people ordinarily skilled in the art of batteries or electric vehicles about the disclosure of this invention.

SUMMARY OF THE INVENTION

The types of batteries are generally classified as chemical batteries, physical batteries, biological batteries and fuel cells, and each type has a different energy density, wherein the type of chemical batteries has the highest energy density that requires no repeated replenishment of fuel. Based on the electric vehicles' extremely high demand for electrical energy, the rechargeable and dischargeable lithium-ion secondary chemical batteries are the best choice for electric vehicle power source thanks to their large energy density per unit weight or per unit volume. Although the lithium-ion secondary batteries are inherently known to have the risk of combustion and explosion, they are still used in electric vehicles as a power source given the lack of better options. At present, what needs to be done is to enhance the risk control over the usage, such as increasing the thickness of metal shell of the battery pack, adding heat pipes, and so on. In addition, the advantages in replacing the internal combustion engine power by the electric energy power mainly come from the reduction of mobile greenhouse gas emissions and the decrease in greenhouse gases, and this has been a global consensus to prevent deterioration of extreme climates.

The present invention provides a flame-retardant and explosion-proof battery pack for an electric vehicle and a manufacturing method thereof, the battery pack comprising: at least one battery brick consisting of a plurality of batteries, which are electrically connected to define a positive electrode welding sheet and a negative electrode welding sheet; a battery brick positive electrode conducting wire and a battery brick negative electrode conducting wire, which are electrically connected to the positive electrode welding sheet and the negative electrode welding sheet, respectively; and a battery brick cover and a battery brick container, which define a first storage space that is sufficient to accommodate the plurality of electrically-connected batteries, wherein the first storage space is filled with a flame-retardant oil so that the plurality of electrically-connected batteries are immersed in the flame-retardant oil, and the positive electrode conducting wire and the battery brick negative electrode conducting wire are exposed outside the first storage space to form a battery brick assembly.

The present invention further provides a flame-retardant and explosion-proof battery pack for an electric vehicle, comprising: a plurality of battery brick assemblies externally connected in series. Each battery pack comprises: a plurality of battery brick assemblies, each battery brick assembly comprising: a battery brick consisting of a plurality of batteries electrically connected in parallel, wherein the plurality of batteries are electrically connected to a battery brick positive electrode conducting wire and a battery brick negative electrode conducting wire; and a battery brick cover and a battery brick container, which define a first storage space, wherein the plurality of batteries are placed into the first storage space with positive electrodes facing upwards, and the battery brick positive electrode conducting wire and the battery brick negative electrode conducting wire are exposed outside the first storage space; and a battery pack cover and a battery pack container, which define a second storage space, wherein the plurality of battery brick assemblies are placed into the second storage space with positive electrodes facing upwards, and are electrically connected in series to define a battery pack positive electrode conducting wire and a battery pack negative electrode conducting wire, which are exposed outside the second storage space.

The present invention further provides a manufacturing method of a flame-retardant and explosion-proof battery pack for electric vehicles, comprising: electrically connecting a plurality of batteries to form a battery brick having a positive electrode welding sheet and a negative electrode welding sheet; electrically connecting a battery brick positive electrode conducting wire and a battery brick negative electrode conducting wire to the positive electrode welding sheet and the negative electrode welding sheet, respectively; placing the battery brick into a first storage space defined by a battery brick cover and a battery brick container; filling a flame-retardant oil into the first storage space so that the plurality of batteries that are electrically connected in parallel are immersed in the flame-retardant oil; and causing the battery brick positive electrode conducting wire and the battery brick negative electrode conducting wire to be exposed outside the first storage space, and engaging the battery brick cover with the battery brick container to form a battery brick assembly.

Besides, the manufacturing method of the present invention further includes the following steps: electrically connecting a plurality of battery brick assemblies to define a battery pack positive electrode conducting wire and a battery pack negative electrode conducting wire, and placing the plurality of battery brick assemblies into a second storage space defined by a battery pack cover and a battery pack container; filling the flame-retardant oil into the second storage space so that the plurality of battery brick assemblies are immersed in the flame-retardant oil; causing the battery pack positive electrode conducting wire and the battery pack negative electrode conducting wire to be exposed outside the second storage space, and engaging the battery pack cover with the battery pack container to form the flame-retardant and explosion-proof battery pack.

In order to support the above-described flame-retardant explosion-proof battery pack and manufacturing method thereof, and considering the issue of energy density, the power source of the electric vehicle of the present embodiment is configured to consist of thousands of the secondary lithium-ion chemical batteries (hereinafter referred to as "batteries"). Firstly, a plurality of batteries are assembled and connected in parallel to form a pack of battery brick (hereinafter referred to as "battery brick") with hundreds of watt-hour (wh.). Secondly, the positive electrodes of the parallel battery brick are configured to face upwards, and sealed into an impact-resistant PC (polycarbonate/polycarbonate) plastic container filled with the flame-retardant oil with positive and negative conductive wires and fuses extending to form a battery brick assembly. Then, a plurality of battery brick assemblies are connected in series by using conductive wires to form a battery pack (hereinafter referred to as "battery brick assembly") of a grade of kilowatt-hours (kwh.) level. Finally, a plurality of battery packs as a structure are "connected in series" by using conductive wires with fuses to form a battery pack group with several tens of kilowatt-hours (kwh.) for electric vehicles.

The aforementioned battery pack group is mounted on the metal chassis of the electric vehicle to form a power source required for the electric vehicle. In this creation, all batteries are "connected in parallel" to form a large capacity battery brick assembly. The method to increase the voltage (or energy) in this creation is that the battery brick assemblies are immersed in the flame-retardant oil, placed into the impact-resistant PC plastic container, and "connected in series" through the external conductive wires equipped with the fuses forming a battery pack, before a plurality of the battery packs are "connected in series" by the external conductive wires equipped with the fuses to increase the voltage (energy), thereby constructing a battery pack group of several tens of kilowatt-hours (kwh.) with thousands of battery positive electrodes facing upwards. This battery pack group has a DC energy output with high voltage and high current.

One of the technical features of this creation is a structure of "parallel connection of the compartments" and "external series connection" of the high-voltage and high-current battery pack "connected in series", wherein all of the positive electrodes of the batteries are facing upwards and given a safety protection mechanism of the fuse for circuit disconnection. If any part of the battery pack group is damaged or crushed in a traffic accident, the partial voltage of the short circuit is only 4.2 volts (volt.) of the battery voltage of the damaged part, and the instantaneous energy released is only the sum of the chemical energy of the damaged part. The battery technology of the external "series connection" in this creation provides the effect of increasing the voltage equivalent to the increased voltage of "series batteries", which can prevent the risk of combustion and explosion arising from the circuit disconnection failure when the conventional "series batteries" are short circuited.

The battery pack of the this creation consists of the battery brick assemblies in "series connection" with positive electrodes facing upwards. It is not only an achievement with the effect of increasing the battery voltage of "series connection", but also a novel design to cease battery electrolyte leakage, which may occur when sealing of the battery-can insulation ring is defective during the packaging process of the battery metal can. Thus, the battery pack with positive electrodes facing upwards does not have a risk of electrolyte leakage and short-circuit even if the sealing is defective. In short, if the battery is lying flat or its positive electrode is facing downwards, and if the sealing is defective, the flammable electrolyte will certainly leak from any crack under the influence of gravity. Since the electrolyte of the lithium-ion secondary battery is flammable, after the leakage, if the conventional positive and negative electrodes are directly connected in series, there must be a voltage difference between the series batteries, and a discharge phenomenon of the short-circuit will occur due to the conduction of the electrolyte, and the energy of melting the electrode plate caused by the short-circuit may lead to a risk of flame combustion or explosion. The technical idea of this creation is, by maintaining battery positive electrodes facing upwards, the possibility of flammable electrolyte leakage due to gravity is totally eradicated, and the short-circuit of the electric vehicle battery pack due to the defect of battery electrolyte leakage under the influence of gravity is also prevented. Thus, this creation has the patentability with an inventive step and an industrial applicability.

Energy conservation is well known, one of the technical ideas of this creation is that the battery brick assemblies with the positive electrodes all facing upwards are placed into a container of battery pack filled with the flame-retardant oil so that each battery is immersed in the flame-retardant oil. When the batteries are in fast charging, the excess energy (wasted heat) of the battery chemical reaction can be released through the flame-retardant oil and be absorbed by the specific heat capacity of the entire battery pack. From the table it is known that the specific heat capacity of air is 1,030 J/kg, and the specific heat capacity of the flame-retardant oil is 2,200 J/kg; the difference between the two is a factor of two, indicating that the air is a poor conductor of heat, and the flame-retardant oil a heat conductor. Thus, dispersing high instantaneous heat within a limited area to be absorbed by the specific heat capacity of the battery pack in this creation is a phenomenon of energy conservation.

The volume of the flame-retardant oil in this creation is about 230 liters and the container is in close contact with the batteries. Therefore, during fast charging of the batteries, the entropy that exceeds the chemical reaction can be absorbed and transferred by the specific heat capacity of the flame-retardant oil as the oil's specific heat capacity and thermal conductivity are better than the air's. In this embodiment, about 230 liters of the flame-retardant oil with a weight of 184 kilograms (kg) is refilled, and the specific heat capacity of the absorbed heat can be up to 4,800 joules, which makes routine fast-charging of over 1C-Rate viable and free from the concern of fast aging and loose density of the electrode plate for being routinely left in a state of thermal expansion and thermal contraction during the fast charging. This creation achieves a shortening of the charging time for electric vehicles. After a 10-minute fast charging of the batteries, the electric vehicle can be expected with enhanced convenience as it can go over 200 kilometers.

DETAILED DESCRIPTION OF THE PREFERRED EMBODIMENTS

Figure 1:
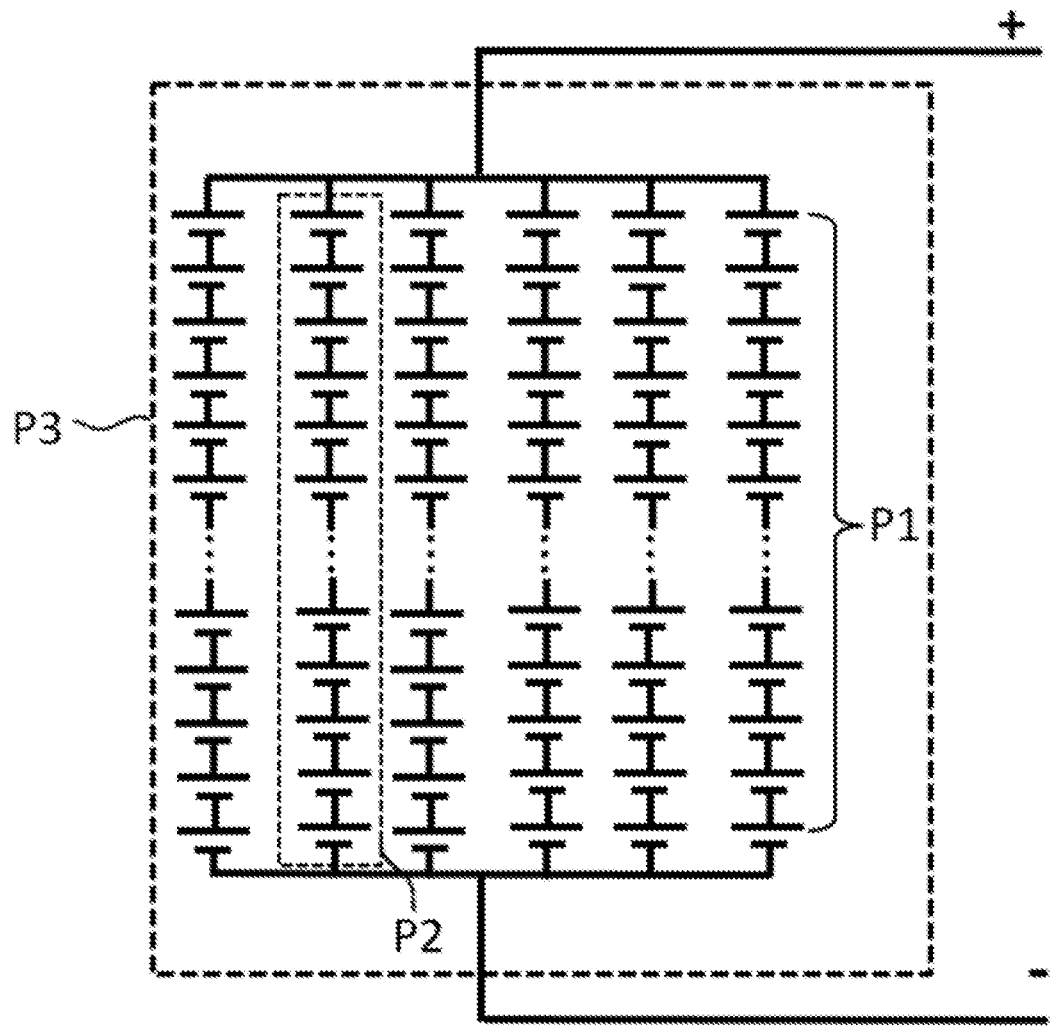
FIG. 1 is a circuit diagram of the battery pack configuration of a common electric vehicle.

The embodiments in the technical fields of the present invention relate to a flame-retardant oil that is thermally conductive, has air barrier properties, a high ignition point and low viscosity, and provides good electrical insulation. When the battery electrode plate is short circuited, it can prevent the contact between the lithium compound in the battery electrode plate and the oxygen molecules ($O_2$) in the air, avoid flame combustion, and transfer the high heat generated by the melting of the electrode plate to the surrounding environment, such that the entropy of the short-circuit causing the battery electrode plate melting is quickly transferred and absorbed by the specific heat capacity of the surrounding batteries and the flame-retardant oil, and to cool down the temperature to avoid chain combustion and explosion. This creation of the flame-retardant oil is not limited to the mineral oil extracts listed in this embodiment, any synthetic fluid, or fluids having the same physical properties listed in the present embodiment, which are included in the scope of the creative technical ideas of the present invention.

The flame-retardant oil disclosed in the present embodiment may refer to an insulating oil typically used in the power distribution system to impregnate the high voltage transformer AC induction coil for dissipating heat and insulating water vapor in the air. This creation interdisciplinarily applies the field of physical properties of the insulation oil of the high-voltage transformer to the field of the manufacturing methods of the flame-retardant and explosion-proof battery pack for electric vehicles as an innovative application and a manufacturing method that uses technical ideas of the laws of nature, in line with the legislative purpose of the Patent Act that "invention means the creation of technical ideas, utilizing the laws of nature".

The electrical insulation strength of the insulation oil of the high-voltage transformer is high, and the breakdown voltage value is usually as high as 40 KV or more, and thus an additional insulation effect can be provided when the external insulation material of the battery deteriorates. In addition, because the flame-retardant oil has the physical properties of large specific heat capacity and low viscosity, when there is short-circuit among the batteries or among the positive and negative electrode plates of batteries causing the melting of the battery electrode plates, the flame-retardant oil can transfer the instantaneous heat energy causing the melting of the electrode plates, and the high heat energy is dispersed and absorbed by the entire battery pack to achieve a safe cooling effect, while the flame-retardant oil having thermal conduction properties becomes a thermal conduction medium (without an convection effect) to quickly transfer the high thermal entropy instantaneously generated by the short-circuit of the battery electrode plate to the room-temperature surrounding area, and the high thermal entropy is absorbed by the specific heat capacity of the adjacent batteries and the flame-retardant oil, and cooling is to avoid an intense reaction of the chain combustion caused by an instantaneous high temperature of battery melting, which completely solves the combustion or explosion caused by short-circuit of the battery or the electrode plate melting.

Therefore, the battery pack is filled with the flame-retardant oil which is to act as a medium for transferring the high temperature caused by the core melting of the accidental short-circuit of the battery electrode plate. The flame-retardant oil refers to a colorless, odorless, high-grade alkane extracted from mineral sources (especially petroleum fractionates), usually with a flash point above 265° C., an ignition point above 300° C., and a density of about 0.8 g/cm3. The flame-retardant oil described in the embodiments of this creation is generally divided into three types: (1) paraffin oil, mainly the n-alkanes; (2) naphthenic oil, mainly the naphthenic hydrocarbons; and (3) aromatic oils, mainly the aromatic hydrocarbons. There are other materials formulated, blended, remixed or added with compatible ingredients from the above types, to the extent that any material having the physical properties of air isolation, heat energy conduction, and combustion block with the technical ideas of this creation is regarded as the flame-retardant and explosion-proof medium oil of the battery pack of this creation.

The creation of the present invention is a manufacturing method of a safety battery pack for the electric vehicle power supply, and the battery pack made by this method has the flame-retardant and explosion-proof safety characteristics. The present embodiment is based on a lithium-ion cylindrical battery (18650 lithium battery) which can be charged or discharged for over hundreds of times of [FIG. 3], and is one of the examples illustrated in the present embodiment, without being subject to the use of the lithium-ion cylindrical battery (18650 lithium battery). All of the technical ideas or methods applying this creation based on the physical properties of the nature are falling within the scope of the claims of the present invention: the use of other types of rechargeable and dischargeable secondary chemical batteries; the filling of the flame-retardant oil; isolation of batteries in a manner of the "parallel connection of the compartments" with the positive electrodes facing upwards; and the configuration of replacing the conventional "series connection" of the positive and negative electrodes with conductive wires equipped with the fusing mechanism in a manner of the "external series connection" in the manufacture of the battery pack for electric vehicles with the flame-retardant and explosion-proof effect.

Figure 2:
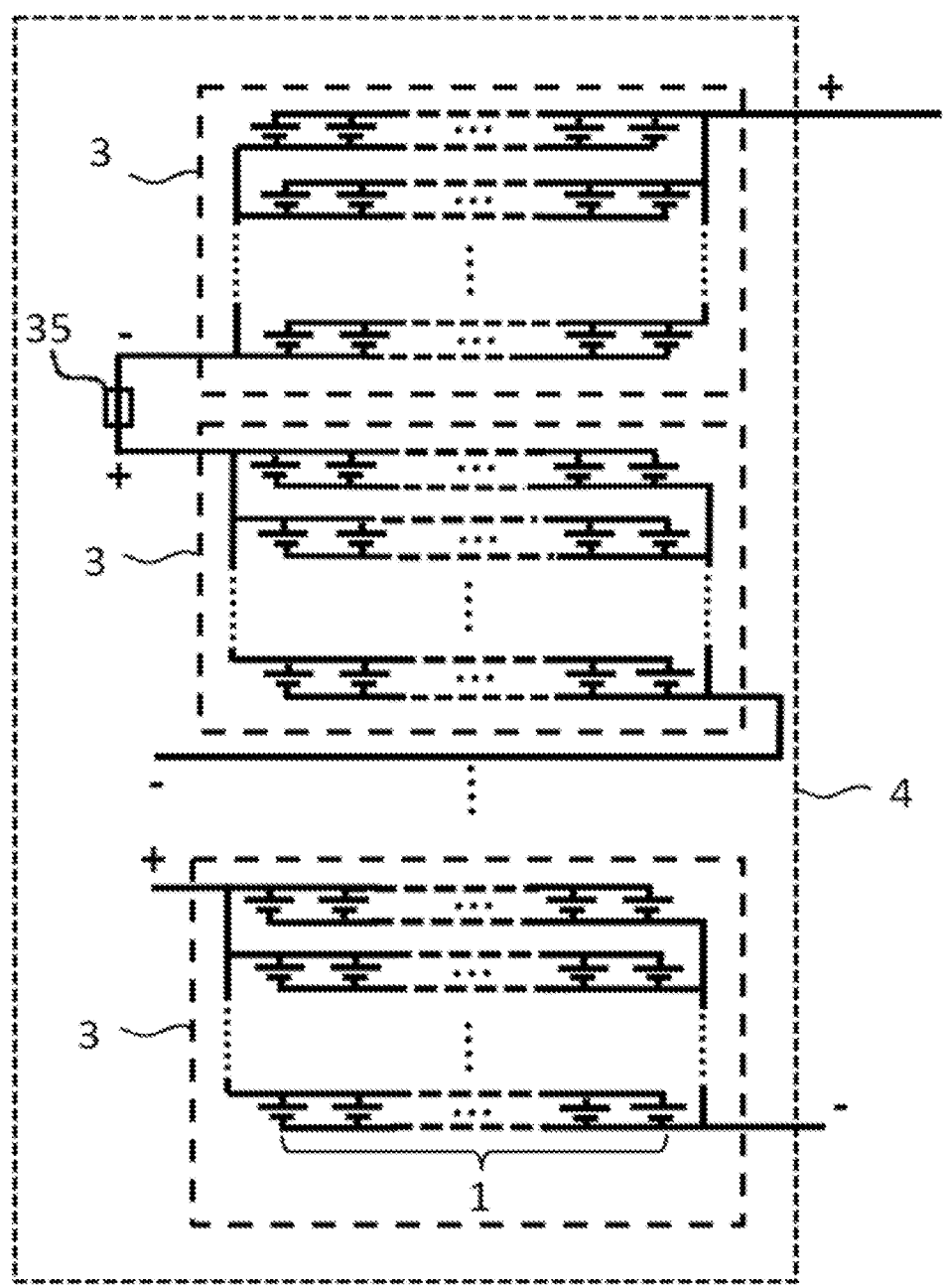
FIG. 2 is a circuit diagram of the battery pack configuration of the flame-retardant and explosion-proof device of the present invention.

Please refer to the circuit diagram of the battery pack (4) according to the configuration of the flame-retardant and explosion-proof device shown in FIG. 2. In detail, the aforementioned architecture of "parallel connection of the compartments" refers to a battery brick assembly (3) having a high current with a plurality of batteries (1) connected in parallel, wherein each battery (1) is configured with its positive electrode facing upwards in the battery brick assembly (3). In a preferred embodiment of a parallel connection, the positive electrodes of the batteries (1) are welded to a positive conductive sheet for parallel connection. Further, the aforementioned architecture of the "external series connection" refers to an external conductive wire connected in series among each battery brick assembly (3) and disposed at the outside of the battery brick assembly (3) so that the plurality of battery brick assemblies (3) are connected in series to form a high-voltage battery pack (4), wherein the external conductive wire among the battery brick assemblies (3) is further configured with a battery brick fuse (35) which can disconnect the circuits among the battery brick assemblies (3) when any battery brick assembly (3) is short-circuited. The architectures of the "parallel connection of the compartments" and the "external series connection" of the present invention form a DC output battery pack (4) having high voltage and high current, and each battery (1) in the battery pack (4) is configured with its positive electrode facing upwards. Compared with the conventional positive and negative electrodes directly "connected in series", the present invention can further prevent the risk of the short-circuit caused by the flammable electrolyte leakage in a condition of high power output.

Before illustrating the embodiment, there is a need to explain briefly the creative technology of the all batteries configured with positive electrodes facing upwards. The positive electrodes facing upwards, which can avoid the risk of the short-circuit of the electrolyte leaking when an insulation gasket (12) (FIG. 3) is defective in the battery making process. If the battery is placed flat or its positive electrode is facing downwards, the flammable electrolyte will leak from the cracks due to gravity, and the battery pack will be short-circuited due to electrolyte leakage. Based on the flammable nature of the electrolyte, there is a risk of combustion or explosion. In addition, this creation further provides other embodiments of the battery configured with the "positive electrode facing upwards", such as: an embodiment of a battery configured in the tilt at an angle relative to the upward direction, or an embodiment of a tilted battery caused by the impact. The flammable electrolyte of the above embodiment is contained within the internal space of the battery due to gravity, and will not leak from the cracks of the positive electrode facing upwards to the outside, thereby reducing the risk of a combustion or an explosion. In another embodiment, the battery can be configured with a 45-degree tilt. All batteries are assembled in parallel connection in this creation, which is to increase the battery pack capacity. In order to increase the voltage, this creation provides a manner of the "external series connection" that replaces the conventional manner of the positive and negative electrodes with direct "series connection", and prevent the failure to disconnect the short-circuit current in the event of a battery pack damage. The above advantage is that the electrical potential of each battery connected in parallel is equal, and the electrical potential difference between any two adjacent batteries is zero and free of short-circuit risks. This manufacturing method of this creation increases the usable capacity of the battery, and effectively avoids the risk of instantaneous discharge due to the voltage difference when the battery pack is short circuited. In order to increase the battery voltage, the conventional manner of the "series connection" is replaced by the manner of the "external series connection" in this creation to increase the voltage of the battery pack. The advantage is that a fuse is available to disconnect the circuit among the battery packs of the "external series connection" to reduce the risk of combustion or explosion of the battery pack in the case of short circuit, while the conventional manner of the positive and negative electrodes directly connected in series does not have a disconnection mechanism.

Figure 3:
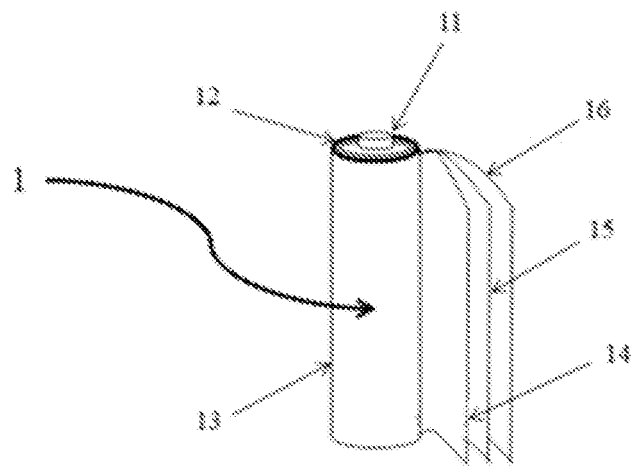
FIG. 3 is a schematic cross-section diagram of a battery of the flame-retardant and explosion-proof device of the present invention.

The following illustrates the details of the flame-retardant and explosion-proof device of a battery (1) of the present invention, please refer to the schematic cross-section diagram of a battery (1) of the present invention shown in FIG. 3, the secondary lithium ion battery (1) comprises a positive electrode plate (14), a negative electrode plate (16) with a negative charge, and an non-conductive insulation sheet (15) (hereinafter referred to as the "insulating sheet") dividing between the two, which can allow the anion shuttle to fill the electrical hole formed by the positive discharge. Place the aforementioned positive electrode plate (14) on the inside, place the insulating sheet (15) in the middle, and place the negative electrode plate (16) on the outside, and then coil and load them into a cylindrical metal negative battery can (13). Next, fill the appropriate amount of oil-soluble electrolyte into the can, and then lead the conductive sheet of the positive electrode plate (14) to the positive battery cap (11) for spot welding, and electrically isolate the positive battery cap (11) and the metal can (13) as the negative electrode of the battery by an insulating gasket (13) to form a battery (1) [FIG. 3]. After the battery (1) is packaged, it has the air tightness for isolating the air, and the material of its cathode is mainly composed of lithium carbonate and precursor materials such as nickel, cobalt and manganese. The voltage difference between the positive and negative electrodes of secondary lithium-ion battery is 4.2V when the battery is fully charged; the lower limit of the discharging voltage cannot be lower than 3.0V, otherwise it cannot be recharged again; the rated voltage is 3.7V; the specifications of the batteries in the present embodiment is the lithium-ion battery 18650, and the current optimal rated capacity so far is 3,400 mAh. The calculation formula (volt*mAh./1,000=wh.) for the energy of the battery pack in the present embodiment is based on a full charge of 4.2 volt.

Since the lithium elements in the secondary lithium-ion battery have the strong oxygenation and even reacts intensely with the oxygen atoms of water, the secondary lithium-ion batteries can only use the hexafluorophosphate ($LiPF_6$) oil-soluble and flammable liquid without the oxygen-based atoms, and cannot use the non-flammable and water-soluble electrolyte. When melting caused by a short-circuit between the positive and negative electrodes, the high temperature will damage the sealing effect of the insulation gasket at the upper end of the metal can. If the air permeate into the can, it will cause the lithium compound to produce an intense oxidation reaction with the oxygen molecules of the permeated air resulting in a flame combustion and even an explosion. At the same time, the oil-soluble electrolyte plays a role of an accelerant, which is the key factor and disadvantage of the flammability of the oil-soluble electrolyte lithium-ion battery. However, the energy density of secondary lithium-ion batteries is much higher than the other of chemical secondary batteries with water-soluble electrolytes, even if there is a potential risk of combustion and explosion, the user still have to choose between risk and practicality for the electric vehicles. According to the regulations governing civil aircrafts, electronic products including lithium-ion batteries shall be carried on board by the passengers and transportation by baggage is forbidden. This is due to the unpredictable risks of the lithium-ion batteries in the air cargo.

When the battery electrode plate of the secondary lithium ion battery is short circuited and melted, if it is not in contact with the oxygen molecules of the air, there will only be a phenomenon of electrode plate melting, and high temperature will be accumulated in the metal battery can without flame combustion or explosion. At the same time, the thermal conduction properties of the flame-retardant oil of the present invention take effect, and quickly transferring and dispersing the instantaneous high temperature of the battery core melting to the surrounding environment, and the high temperature is then absorbed and cooled down by the flame-retardant oil of this creation and by the specific heat capacity of the other batteries, without combustion or explosion caused by the short-circuited batteries, nor a chain combustion reaction of the adjacent batteries. The melting point of lithium is 180° C.; the flame point of the retardant fuel oil (naphthenic mineral oil) is above 300° C. If the melting temperature of the battery electrode plate is instantly conducted, absorbed, and released to the surrounding environment through the flame-retardant oil, and the oxygen molecules of the air are thoroughly isolated and blocked, the short circuit leading flame combustion can be avoided, and serious results such as explosions can be prevented. The physical law applied to the flame-retardant oil in this creation is based on the thermal conduction effect, and the formula is as follows:

Formula: $q = -k \cdot \nabla T$ (calculate the heat flux through unit area per unit of time). where:

q represents the heat flux density in units $W \cdot m^{-2}$.
k represents the thermal conductivity of the material in units $W \cdot m^{-1} K^{-1}$.
$\nabla T$ represents the temperature gradient in units $K \cdot m^{-1}$.

The flame-retardant oil in this creation is of liquid property, and the heat conduction method of the liquid also has the thermal convection effect. Since every two paralleled batteries are closely adjacent side by side, the flame-retardant oil filled in the battery brick assembly or battery pack only occupies 21% of the space, is separated by each battery, and flows through the gap between the batteries. Since the melting entropy caused by the short circuit of the battery electrode plate is quickly absorbed and transferred by the specific heat capacity of the flame-retardant oil before a slow convective effect to take place, the melting entropy has been transferred in a gradient manner and absorbed by the adjacent secondary battery in room temperature, the thermal convection effect is almost ignorable in the present embodiment.

Figure 4:
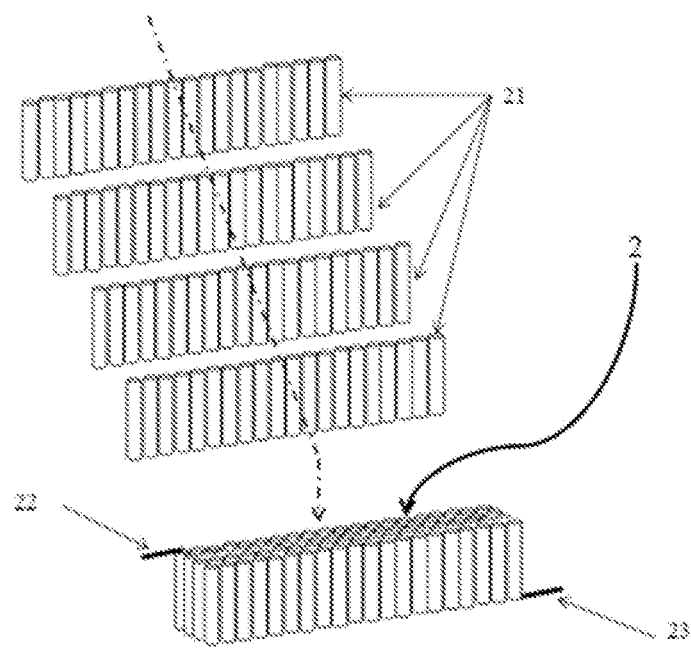
FIG. 4 is a schematic diagram of the battery brick of the flame-retardant explosion-proof device of the present invention.

First, as shown in [FIG. 4], the present creation consists of 20 batteries (1) with the positive electrode facing upwards, and those batteries are connected in parallel to form a battery row (21), and then the four battery rows (21) are connected in parallel to form a battery brick (2) with a positive electrode welding sheet (22) and a negative electrode welding sheet (23), and the battery brick (2) becomes a large-capacity and low-voltage component with the same electrical potential and a DC voltage of only 4.2V.

Next, it is illustrated with details of welding and assembly of the battery brick (2). Since the battery bricks (2) are connected in parallel and arranged in a matrix, the position of the welding point between the positive electrode welding sheet (22) and the negative electrode welding sheet (23) in the battery brick (2) will affect the charge and discharge path of each battery (1), and if the lengths of long and short loops of the parallel circuit are not the same, the electrical impedance of the long and short loops will be unequal, which will inevitably lead to the differences in the degree (efficiency) of the chemical reaction generated by the individual battery during the charging and discharging of batteries. If the charging and discharging paths of each battery (1) in the battery brick (2) are not equal, and with an accumulation effect of multiple times of the charging and discharging of the battery brick (2) for a long time, some batteries (1) will age in an accelerating speed due to the relatively shorter welding loops, because aging batteries (1) that are overcharged and over-discharged will be exhausted of the rated capacity or no longer available for charging and discharging. The welded assembly of the battery brick (2) of the present invention shown in [FIG. 5] is expected to solve this problem.

Figure 5:
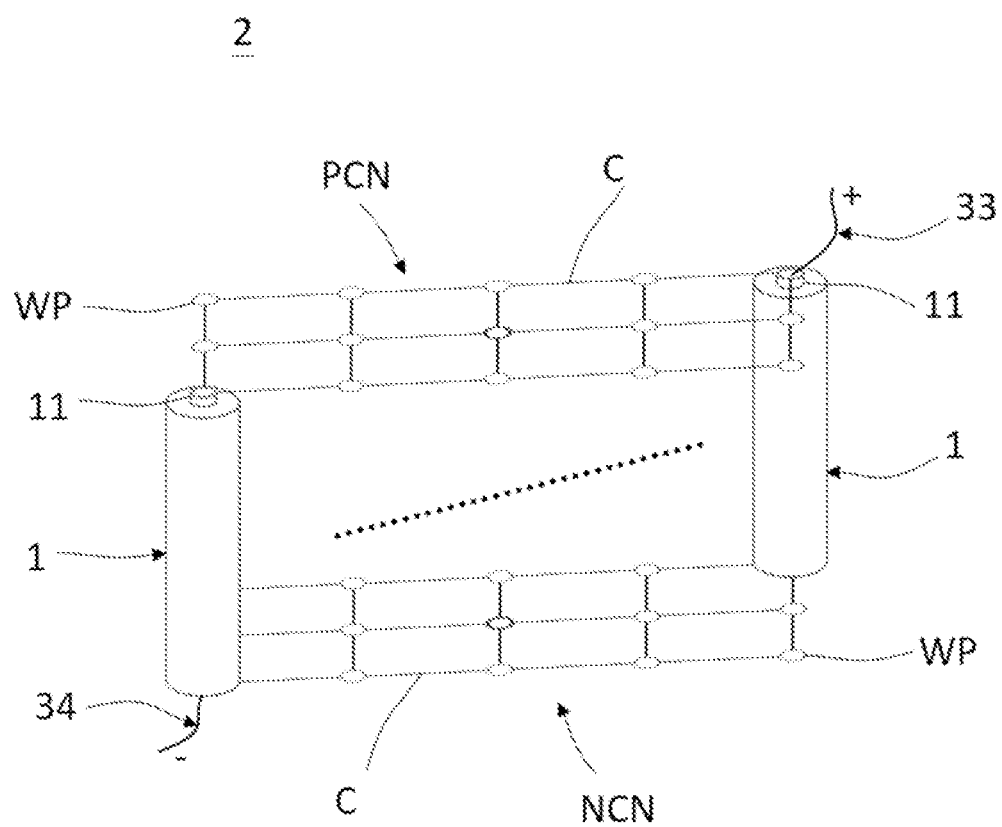
FIG. 5 is a schematic diagram showing how to weld and assemble the battery brick of the present invention.

Please refer to the schematic diagram of welding assembly of the battery bricks of the present invention in [FIG. 5]. The battery bricks (2) are connected in parallel and arranged in a matrix, wherein most of the batteries (1) are omitted from [FIG. 5] for better understanding. Take the direction of the positive electrode of the battery as an example, each battery (1) provides the positive electrode battery cap (11) as a welding Point (WP), and by welding a conductive strip (C) to another adjacent positive electrode battery cap (11), each battery (1) is connected in the shortest path, and the conductive strips (C) configured on the positive electrodes of the batteries (1) are generally formed a Positive-electrode Conducting-strip Network (PCN). Similarly, the conductive strips (C) configured on the negative electrodes of the batteries (1) are generally formed a Negative-electrode Conducting-strip Network (NCN). In a preferred embodiment of the present invention, in any one of the two batteries (1) diagonally configured in the battery brick (2), a positive electrode welding sheet (22) is configured to be welded on a positive electrode of a battery (1) as well as the negative electrode of another battery diagonally positioned, a negative electrode welding sheet (23) is configured (1) to the negative electrode of a battery (1), forming a extending point for the positive electrode conductive wire and the negative electrode conductive wire of the battery brick (2). In another embodiment of the present invention, the Positive-electrode Conducting-strip Network (PCN) and the Negative-electrode Conducting-strip Network (NCN) may be respectively replaced by a positive conductive plate and a negative conductive plate so that the batteries (1) can be more stably disposed between the two conductive plates, wherein the positive electrode welding sheet (22) and the negative electrode welding sheet (23) are configured respectively to the positive or negative electrode of the two batteries (1) diagonally positioned in the battery brick (2) as the aforementioned embodiment.

Figure 6:
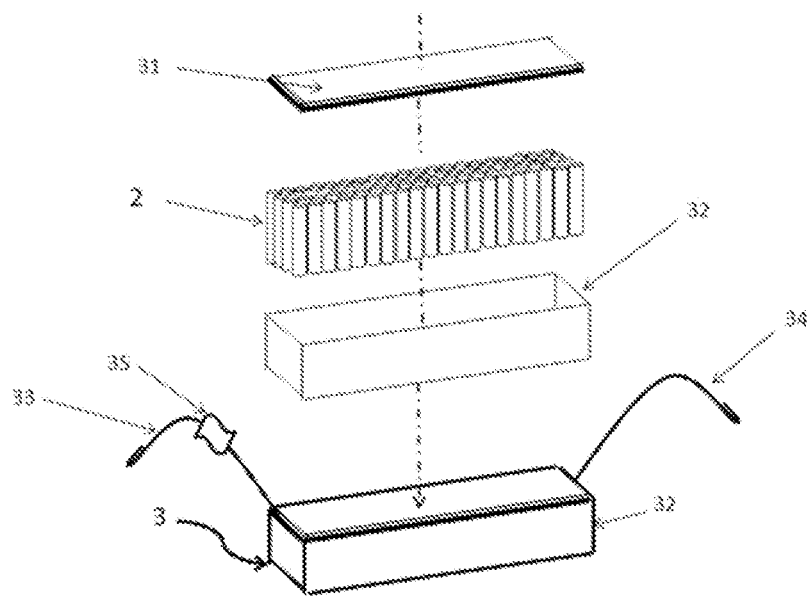
FIG. 6 is a schematic diagram of the battery brick assembly of the flame-retardant and explosion-proof device of the present invention.

Secondly, as shown in [FIG. 6], the battery brick (2) is placed into the impact-resistant PC battery brick container (32), and the battery brick positive conductive wire (33) containing the fuse (35) is welded to the positive electrode welding sheet (22) and pulled out from the PC battery brick container (32); similarly, the battery brick negative conductive wire (34) is welded to the negative electrode welding sheet (23) and pulled out from the PC battery brick container (32). The impact-resistant PC battery brick container (32) is fully filled with the flame-retardant oil and tightly sealed by the impact-resistant PC battery brick cover (31) to form the battery brick assembly (3) having the DC voltage of 4.2V and the capacity of 1.14 kwh as a backup. As shown in [FIG. 7], the aforementioned battery brick assembly (3) is formed as a group of four units, all with the positive electrode facing upwards and "connected in series" to form a battery pack (4), and the output voltage of the battery pack can reach to 16.8V and a capacity of 4.56 kwh due to the "series connection" manner. The assembly technology of the "external series connection" in this creation enables the batteries in the battery pack (4) to be configured with all positive electrodes facing upwards to avoid the risk of the leakage of electrolyte. The battery brick positive wires (33) and battery brick negative wires (34) of four battery brick assemblies (3) are connected in series one by one to form the battery packs (4). Since the series circuit is provided with a fuse (35), the fuse can disconnect the circuit of the battery brick assembly (3) connected in series in the event of a short circuit. In addition, since the batteries in each battery brick assembly (3) are connected in parallel with the positive electrode facing upwards, even if it is accidentally crushed in a traffic accident, or even if the impact-resistant PC plastic battery brick container (32) and the impact-resistant PC battery brick cover (31) are both damaged, to the most there may be instantaneous thermal entropy of 4.2V arising from a plurality of battery electrode plate short-circuit, without the phenomenon of battery chain short-circuit different to the usual case of "series connection battery" that lacks the fuse to disconnect the short-circuit of 16.8V DC output. In addition, since the battery brick assembly (3) is filled with the flame-retardant oil, it can isolate the oxygen in the air from the contact with the lithium element of the battery electrode plate, and can transfer, absorbed, and release the instantaneous heat caused by the battery melting in prevention of combustion or explosion of the battery pack (4) fully filled with the flame-retardant oil.

Finally, take 20 of the aforementioned battery packs (4) having 16.8V DC output and 4.56 kwh capacity with all positive electrode facing upwards as one unit, install the unit within the metal frame of the electric vehicle's solid chassis, with the battery pack positive conductive wire (43) and the battery pack negative conductive wire (44) connected in series as a battery group comprising a battery pack fuse (45), and sufficient for the electric vehicle in the present embodiment to travel hundreds of kilometers. The DC voltage of this battery group is 336V and the capacity is 91.4 kwh. Since each of the 20 battery packs (4) of the chassis frame of the electric vehicle is individually sealed within the impact-resistant PC plastic battery pack container (42) and with the PC battery pack cover (41) of the same material, and is immersed in the flame-retardant oil, and each battery pack (4) consists of a battery brick assembly (3) made of the batteries connected in parallel, and all of them are configured with the positive electrode facing upwards in the assembly. If the battery pack is damaged and crushed in an accident, there will only be an accumulation of the melting temperature of the electrode plate of 4.2V of the battery (1) (the melting point of lithium is 180° C.). Under normal uses, the risk of accidental combustion and explosion of electric vehicles can be overcome by the present creation of the flame-retardant oil as well as and the novel design of "parallel connection of the compartments", "external series connection" and positive electrodes of battery fall facing upwards, which effectively improve the safety of electric vehicles.

One of the major features in this creation is that it precludes flame combustion and explosion risks of any battery in the electric vehicle battery pack arising from the short-circuit and melting of the electrode plate. In the creation of the present invention, there is no need to change the original safety protection components in the battery pack for electric vehicles, what needs to be done is to add to the battery pack of the current electric vehicle a flame-retardant oil having thermal conduction, electrical insulation and air barrier properties, a high ignition point, and low viscosity, so that each battery is immersed in the flame-retardant oil to provide flame-retardant and explosion-proof safety functions of the electric vehicle battery pack, and greatly increase the safety of electric vehicle driving.

The flame-retardant oil in the present invention is extracted or synthesized from the naphthenic mineral oil at a low cost. The present invention applies the original physical properties of the naphthyl mineral oil to enhance the safety performance of electric vehicles, and thus is an invention with an inventive step and industrial applicability. Further, it relates to a novel manufacturing method with technical ideals of the laws of nature, satisfying the patentability prerequisite of "where an article produced following a manufacturing process is still unknown within and outside of this country before the filing of a patent application for the manufacturing process."

In view of the combustion and explosion phenomenon of the battery pack for electric vehicles, when the batteries are connected in parallel and connected in series, with increased voltage and energy, there will be combustion or explosion caused by the short-circuit under specific conditions, such as a conduction current caused by battery leakage or the battery pack is impacted and crushed in a traffic accident, etc. The more batteries are connected in series, the higher voltage there will be, and the more batteries are connected in parallel, the greater watt-hour energy there will be. The DC voltage of the present embodiment is 336V, and the fully-charged energy is 91.4 kwh, which satisfies the electricity demand of an average household in one month.

Figure 7:
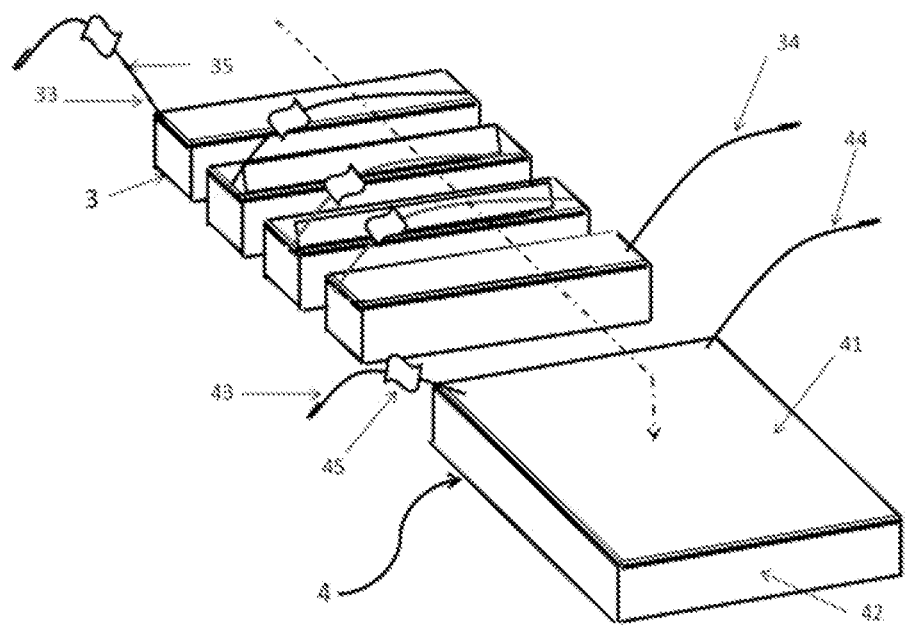
FIG. 7 is a schematic diagram of the battery pack of the flame-retardant and explosion-proof device of the present invention.

The present embodiment consists of 6,400 batteries, connected in parallel first and then "connected in series" to form a battery brick assembly [FIG. 6], and the battery brick assemblies are again "connected in series" to form a battery pack [FIG. 7], and finally 20 battery packs are "connected in series" to form a "battery group". This battery group has a DC voltage of 336V and an effective energy of 91.4 kwh when fully charged. It is assembled in the manner of "parallel connection of the compartments", "external series connection" and "positive electrode facing upward", so that all of the batteries in the battery pack are in "parallel connection" and achieve the effect of "external series connection" to increase the voltage in a manner of "series connection". The manner of increasing the voltage in this creation adopts the approach of compartments separation and a fusing mechanism, and therefore avoids the risk of directly series connection of the positive and negative electrodes of the battery. As a result, the 6,400 batteries in the battery group of this creation are entirely in a state of zero difference in electrical potential as if they were in "parallel connection", if short-circuit occurs, the sub-voltage of any defected part of the battery pack is 4.2V to prevent accidents, where there is short-circuit of high-voltage difference of the series batteries that leads to a risk of combustion with instantaneous high-current discharge, and that is how this battery pack having flame-retardant and explosion-proof performances in this creation comes to pass.

The above embodiments represent a creation that starts with a battery, and by applying the physical properties such as thermal conduction, air barrier, electrical insulation and gravity, it is implemented with various assembly steps one by one, and turned into an electric vehicle battery group comprising up to 6,400 batteries with positive electrode facing upwards and the flame-retardant and explosion-proof safety performances. The design concept of the innovative electric vehicle battery pack in the present invention certainly provides a manufacturing method having an inventive step, novelty, and an industrial applicability.

What is claimed is:

1. A flame-retardant and explosion-proof battery pack for an electric vehicle, comprising:
   a battery pack cover and a battery pack container, which define a sealed second storage space;
   at least one battery brick consisting of a plurality of batteries, which are electrically connected to define a positive electrode welding sheet and a negative electrode welding sheet;
   a battery brick positive electrode conducting wire and a battery brick negative electrode conducting wire, which are electrically connected to the positive electrode welding sheet and the negative electrode welding sheet, respectively;
   a battery brick cover and a battery brick container, which define a first storage space that is sufficient to accommodate the plurality of electrically-connected batteries; and
   wherein the first storage space is filled with a flame-retardant oil so that the plurality of electrically-connected batteries are immersed in the flame-retardant oil so as to isolate the plurality of electrically-connected batteries from contact with air, and the battery brick positive electrode conducting wire and the battery brick negative electrode conducting wire are exposed outside the first storage space to form a battery brick assembly;

wherein the second storage space is sufficient to accommodate at least one battery brick assembly without a heat exchange device, and the second storage space is filled with the flame-retardant oil so that the battery brick assemblies are immersed in the flame-retardant oil;

wherein the plurality of batteries is arranged in a tilt direction so that electrolyte leakage is avoided;

wherein the flame-retardant oil has a heat capacity that is 2,200 J/Kg.

2. The flame-retardant and explosion-proof battery pack according to claim 1, wherein the battery brick assemblies are electrically connected to define a battery pack positive electrode conducting wire and a battery pack negative electrode conducting wire, which are exposed outside the second storage space.

3. The flame-retardant and explosion-proof battery pack according to claim 2, further comprising at least one battery brick fuse disposed between two electrically-connected battery brick assemblies.

4. The flame-retardant and explosion-proof battery pack according to claim 2, further comprising a battery pack fuse disposed on one of the battery pack positive electrode conducting wire and the battery pack negative electrode conducting wire exposed outside the second storage space.

5. The flame-retardant and explosion-proof battery pack according to claim 1, wherein the battery bricks are connected in parallel and arranged in a matrix, and the positive electrode welding sheet and the negative electrode welding sheet are respectively welded to a positive electrode or a negative electrode of two batteries diagonally positioned in the battery brick.

6. The flame-retardant and explosion-proof battery pack according to claim 1, wherein the flame-retardant oil consists of at least one of paraffinic mineral oil, naphthenic oil, and aromatic hydrocarbon oil.

7. The flame-retardant and explosion-proof battery pack according to claim 1, wherein the flame-retardant oil is thermally conductive, has air barrier and electrical insulation properties, and has an ignition point above 300° C. and/or a flash point above 265° C.

8. The flame-retardant and explosion-proof battery pack according to claim 1, wherein the battery brick cover and the battery brick container are made of polycarbonate.

9. The flame-retardant and explosion-proof battery pack according to claim 1, wherein the plurality of batteries are electrically connected in parallel to define the positive electrode welding sheet and the negative electrode welding sheet.

10. A manufacturing method of a flame-retardant and explosion-proof battery pack for an electric vehicle, comprising:

electrically connecting a plurality of batteries to form a battery brick having a positive electrode welding sheet and a negative electrode welding sheet;

electrically connecting a battery brick positive electrode conducting wire and a battery brick negative electrode conducting wire to the positive electrode welding sheet and the negative electrode welding sheet, respectively;

placing the battery brick into a first storage space defined by a battery brick cover and a battery brick container;

filling a flame-retardant oil into the first storage space so that the plurality of batteries that are electronically connected are immersed in the flame-retardant oil so as to isolate the plurality of electrically-connected batteries from contact with air;

causing the battery brick positive electrode conducting wire and the battery brick negative electrode conducting wire to be exposed outside the first storage space, and engaging the battery brick cover with the battery brick container to form a battery brick assembly;

placing the plurality of battery brick assemblies in to a sealed second storage space defined by a battery pack cover and a battery pack container without a heat exchange device;

filling the flame-retardant oil into the second storage space so that the battery brick assemblies are immersed in the flame-retardant oil;

wherein the plurality of batteries is arranged in a tilt direction so that electrolyte leakage is avoided; and wherein the flame-retardant oil has a heat capacity that is 2,200 J/Kg.

11. The manufacturing method according to claim 10, further comprising;

electrically connecting a plurality of battery brick assemblies to define a battery pack positive electrode conducting wire and a battery pack negative electrode conducting wire;

causing the battery pack positive electrode conducting wire and the battery pack negative electrode conducting wire to be exposed outside the second storage space, and engaging the battery pack cover with the battery pack container to form the flame-retardant and explosion-proof battery pack.

12. The manufacturing method according to claim 11, further comprising;

placing the plurality of batteries electrically connected in parallel into the first storage space with positive electrodes facing upwards; and placing the plurality of battery brick assemblies electrically connected in series into the second storage space with positive electrodes facing upwards.

* * * * *